US012123467B2

(12) United States Patent
Schoener et al.

(10) Patent No.: US 12,123,467 B2
(45) Date of Patent: Oct. 22, 2024

(54) CONSTANT VELOCITY JOINT

(71) Applicant: Neumayer Tekfor Engineering GmbH, Hausach (DE)

(72) Inventors: Daniel Schoener, Oberharmersbach (DE); Martin Lehmann, Hornberg (DE)

(73) Assignee: NEUMAYER TEKFOR ENGINEERING GMBH, Hausach (DE)

( * ) Notice: Subject to any disclaimer, the term of this patent is extended or adjusted under 35 U.S.C. 154(b) by 435 days.

(21) Appl. No.: 17/451,087

(22) Filed: Oct. 15, 2021

(65) Prior Publication Data

US 2022/0120320 A1 Apr. 21, 2022

(30) Foreign Application Priority Data

Oct. 16, 2020 (DE) ...................... 10 2020 006 371.3

(51) Int. Cl.
F16D 3/223 (2011.01)
(52) U.S. Cl.
CPC .... F16D 3/223 (2013.01); F16D 2003/22326 (2013.01); Y10S 464/906 (2013.01); Y10T 403/4949 (2015.01); Y10T 403/4966 (2015.01)
(58) Field of Classification Search
CPC ........... F16D 3/223; F16D 2003/22326; Y10S 464/906; Y10T 403/4949; Y10T 403/4966
USPC ....................................................... 464/182
See application file for complete search history.

(56) References Cited

U.S. PATENT DOCUMENTS 4,629,028 A * 12/1986 Krude .................. F16D 3/2237
6,413,008 B1 7/2002 Dest et al.
2013/0252748 A1 9/2013 Sugiyama et al.

FOREIGN PATENT DOCUMENTS

| DE | 43 10 007 C1 | 10/1994 | |
|---|---|---|---|
| DE | 102 53 627 A1 | 7/2003 | |
| DE | 10 2009 051 170 A1 | 5/2010 | |
| DE | 10 2013 004 324 A1 | 9/2013 | |
| IT | 614159 | * 12/1960 | ................... 464/182 |

OTHER PUBLICATIONS

German-language Search Report issued in German Application No. 10 2020 006 371.3 dated Jul. 23, 2021 with a partial English translation (11 pages).
European Search Report issued in connection with EP Appl. No. 21000290.3 dated Mar. 17, 2022.

* cited by examiner

Primary Examiner — Greg Binda
(74) Attorney, Agent, or Firm — FOLEY & LARDNER LLP

(57) ABSTRACT

A constant velocity joint having an inner hub, an annular outer hub, a plurality of balls and a shaft connection component, with the outer hub in contact with the shaft connection component. The shaft connection component has, at an end region facing the outer hub, a securing structure which is in contact with a contacting structure of the outer hub. The outer hub contacting structure includes recesses corresponding to the raised portions of shaft connection component. The raised portions engage in the recesses to form a securing structure. The tracks and the recesses of the outer hub are arranged axially in alignment with each other.

20 Claims, 16 Drawing Sheets

CONSTANT VELOCITY JOINT

BACKGROUND AND SUMMARY OF THE INVENTION

The present invention relates to a constant velocity joint, as used, for example, in the drive train of a motor vehicle. Another term for a constant velocity joint is, for example, spherical homokinetic joint.

In vehicles, constant velocity joints are used, for example, in the drive train in order to transmit the torque of the engine to a tire axle. In this instance, balls are used to transmit force and torque between an outer hub and an inner hub of the joint. A cage having apertures retains the balls in a plane in order to enable bending of the joint. The joint is generally located in this case between two components via which torques and forces are transmitted. The components belong, for example, to the longitudinal or transverse shafts of a vehicle. Based on the type and nature of the components, between which the joint is intended to be introduced, specific transmission components are therefore required between the joint and the components (for example, shaft portions). This generally involves increased costs and may require specific and therefore very inflexible embodiments. The components of the joint or the components which are connected to the joint for connection to the surrounding components are in this instance and below referred to as shaft connection components. Generally in this instance two shaft connection components are provided for the joint.

DE 10 2009 051 170 A1 discloses, for example, such a constant velocity joint. In this instance, the connection of the joint between two shafts is enabled by the inner hub having a plug-type tooth arrangement and a carrier housing which is contacted with the outer hub being provided. For the connection between the carrier housing and outer hub, in this instance either a sleeve is provided or the carrier housing itself is deformed. Consequently, either a sleeve is required as an additional component or the carrier housing must be constructed in a specific manner in order to enable the deformation.

DE 102 53 627 A1 discloses constant velocity joints in which the outer hub is connected to a separate pin or is constructed integrally therewith.

A flange connection between the end faces of an outer hub of a joint and a connection element is set out in DE 43 10 007 C1. The end faces have different surface hardnesses and are in toothed engagement with each other.

A connection between a joint shaft and the inner hub of a constant velocity joint is disclosed in DE 10 2013 004 324 A1. In this instance, the transition region is surrounded by a sleeve.

An object of the invention is to provide a constant velocity joint which is characterized by being connected to the surrounding components in a manner which can be adapted in the easiest manner possible and which is preferably cost-effective.

The object of the invention is achieved with a constant velocity joint having an inner hub, an annular outer hub, a plurality of balls and a shaft connection component, wherein the inner hub has tracks, wherein the outer hub has tracks, wherein the tracks of the inner hub and the tracks of the outer hub are associated with each other in pairs and each receive a ball, wherein the outer hub is contacted with the shaft connection component, wherein the outer hub has a contacting structure, wherein the shaft connection component has a securing structure at an end region facing the outer hub, wherein the securing structure and the contacting structure are indirectly or directly connected to each other in a non-positive-locking and/or torque-transmitting manner, wherein the outer hub has recesses as a contacting structure, wherein the shaft connection component has raised portions as a securing structure, wherein the raised portions engage in the recesses, and wherein the tracks of the outer hub and the recesses of the outer hub are arranged axially in alignment with each other.

From the prior art, it is known that the outer hub and the shaft connection component can together form a unit. In the invention, this is expanded in relation to the question as to how two functional units (that is to say, outer hub and shaft connection component) are connected to each other in the most effective manner possible or how they are intended to be configured for this purpose. In the invention, the outer hub—preferably at the inner side thereof—carries tracks for the balls and in addition a contacting structure for the connection to the shaft connection component. The shaft connection component has at an end region which faces the outer hub a securing structure which together with the contacting structure produces a non-positive-locking connection (that is to say, for the transmission of forces) and/or a torque-transmitting connection (that is to say, for the transmission of moments or in particular torques). In this case, the connection is carried out depending on the embodiment directly between the outer hub and shaft connection component or indirectly by means of an additional component which is accordingly connected to the contacting structure or the securing structure. In the invention there is consequently produced a joint with a stable connection which enables the reliable transmission of the forces and torques between the shaft connection component and the outer hub and therefore, for example, between a shaft portion and the constant velocity joint itself. Furthermore, as a result of the invention, the adaptation to the type, for example, of shaft portion which follows the constant velocity joint or the type of connection to the surrounding components can be carried out via the configuration of the shaft connection component. In an embodiment, the components of the constant velocity joint are in particular configured in a rotationally symmetrical manner about the longitudinal axis of the constant velocity joint.

The outer hub has recesses as a contacting structure. The tracks of the outer hub and the recesses of the outer hub are arranged axially in alignment with each other. The recesses are located axially along a longitudinal axis of the constant velocity joint or the outer hub behind or in front of the tracks of the outer hub. The aligned orientation relates in this instance, for example, to a respective longitudinal axis of the tracks or the recesses. Alternatively, the aligned orientation is produced by the tracks and the recesses being produced substantially in the same material portion of the blank during a massive forming operation.

The shaft connection component has (for example, endface) raised portions as a securing structure. In this instance, the raised portions engage in a positive-locking manner in the recesses of the outer hub. The radial outer contour of the raised portions is consequently at least similar to the radial inner structure of the recesses. The recesses are preferably located in this instance at the inner side of an annular outer hub. The recesses are in an embodiment semi-annular open structures which adjoin the—substantially circular-cylindrical—inner space of the outer hubs. That is to say: the outer hub surrounds in an annular manner a free—and preferably circular-cylindrical—inner space. On the inner wall there are semi-annular recesses (the recesses consequently also extend particularly in a radial direction) or cavities which extend radially outward. Consequently, for example, the raised portions at the end face of the shaft connection are introduced for a positive-locking engagement in the recesses. It is equivalent when the recesses and raised portions at the outer hub and shaft connection component are arranged precisely in a transposed manner.

In one embodiment, therefore, the shaft connection component has end-face raised portions as a securing structure.

An embodiment involves the shaft connection component and the outer hub being massive formed components.

The following embodiments partially relate to the type of securing structure and the type of connection.

According to an embodiment, the recesses of the outer hub are arranged at the end face. The recesses consequently form a portion of the end face of the outer hub which accordingly comes into contact with the end face of the shaft connection component. In other words: the recesses form a portion of an axial end of the outer hub.

Alternatively, the recesses are located at an outer side of the outer hub.

According to an embodiment, the recesses are configured as cavities. In this embodiment, consequently, for example, at the end face of the outer hub, gaps or free spaces are provided as recesses in which corresponding raised portions of the shaft connection component engage. Or, in other words: in an embodiment, the end face of the outer hub comprises an alternating arrangement of raised portions (or tips) and recesses (or gaps). The gaps axially adjoin the tracks in this instance.

According to an embodiment, the shaft connection component has a knurling as a securing structure. Alternatively or additionally, the outer hub has a knurling as a contacting structure. The securing structure and the contacting structure (of which at least one comprises a knurling) are pressed together in order to bring about the connection between the shaft connection component and outer hub. The outer hub and/or the carrier component has/have in one embodiment a substantially cylindrical inner or outer diameter. In this embodiment, a knurling is located thereon.

According to an alternative or additional embodiment, there is provision for the raised portions of the shaft connection component as a result of a deformation to engage in the recesses of the outer hub and to bring about an axial securing. In this embodiment, consequently, in addition, for example, to the above-mentioned embodiment, a deformation of the raised portions is carried out so that material of the shaft connection component is thereby introduced into the cavities or the recesses of the outer hub and consequently a direct positive-locking connection is produced. The shaping consequently presses portions of the shaft connection component (that is to say, the raised portions) into the recesses.

In an embodiment, the pressing-in action is produced particularly in a variant in which the recesses are located at an outer side of the outer hub.

In one embodiment, the outer hub has in this instance recesses which are configured as returns at the outer side. These are thus regions of the outer side which have a reduced outer diameter in relation to the adjacent portions.

In an embodiment, the raised portions of the shaft connection component are at the end face and the end-face raised portions are connected to each other by means of a radially peripheral collar. This collar serves to stabilize the raised portions. In an embodiment, the collar and the raised portions are configured in such a manner that the raised portions represent a type of radial extension of the collar.

One embodiment is such that the radially peripheral collar is arranged at a radial inner side of the end-face raised portions. In this embodiment, the collar is a type of inner ring, from which the raised portions extend outward in a radial direction.

An alternative variant makes provision for the radially peripheral collar to be arranged at a radial outer side of the end-face raised portions. In this embodiment, the raised portions are surrounded by a radially outer collar. If the corresponding structure of the outer hub consequently engages in the structure of the end face of the shaft connection component, this collar forms the outer periphery of the combination of shaft connection component and outer hub.

The recesses are preferably located—in the same manner as the tracks—at an inner side of the outer hub. This simplifies, for example, the technical shaping production method. In an embodiment, the recesses are thus an axial extension of the tracks.

An embodiment involves the raised portions being configured as stumps at an end face of the shaft connection component facing the outer hub. In this embodiment, stumps protrude over the end face of the shaft connection component and consequently enable engagement in the recesses of the outer hub. In an embodiment, the stumps protrude along a longitudinal axis of the shaft connection component beyond the end face.

According to another aspect of teaching of the invention, the connection between the shaft connection component and outer hub is carried out indirectly by means of a third component.

An embodiment thus makes provision for the outer hub to have recesses as a contacting structure, for the constant velocity joint to further have a sleeve component having carrier components, for the shaft connection component to have at least one securing recess as a securing structure and for the sleeve component to engage with the carrier components in the at least one securing recess and in the recesses and consequently to connect the sleeve component and the outer hub to each other in a non-positive-locking and/or torque-transmitting manner. In this embodiment, the connection for transmitting forces and/or torques between the sleeve component and external force is produced by means of a sleeve component. To this end, the shaft connection component has at least one recess which is referred to here and below as a securing recess. Carrier components (or carriers for short) of the sleeve component engage in this securing recess and in the recesses of the outer hub. The carrier components of the sleeve component (or alternatively: sleeve) are in one embodiment integral regions of the sleeve component.

In the above-mentioned variant of the constant velocity joint, portions of the sleeve component are thus connected to recesses of the outer hub or the shaft connection component in order to produce the connection for forces and torques.

According to an embodiment, there is provision for the carrier components to have different radial extents and for the carrier components which engage in the recesses of the outer hub to protrude radially further inward than the carrier components which engage in the securing recesses of the shaft connection component. In this embodiment, the carrier components protrude to differing degrees radially into the recesses of the outer hub. Particularly the carrier components (or carriers for short) are thus located further in the direction toward the interior of the joint. This has the advantage that, when the joint is joined, the carriers which are in contact with the outer ring do not come into contact with the carriers which are located axially in front for the shaft connection component.

An embodiment involves the constant velocity joint further having a sleeve component having carrier components, the shaft connection component having a knurling as a securing structure and/or the outer hub having a knurling as a contacting structure, and the sleeve component engaging with the carrier components in the securing structure and in the contacting structure and consequently connecting the sleeve component and the outer hub to each other in a non-positive-locking and/or positive-locking manner. In this embodiment, the shaft connection component and/or the outer hub is provided with a knurling. The sleeve component or more specifically: carrier components of the sleeve component are, for example, pressed into this knurling. Depending on the embodiment, other carrier components are introduced into the outer hub or shaft connection component and therefore bring about on the whole the non-positive-locking and/or torque-transmitting connection between the shaft connection component and the outer hub. In an embodiment, the sleeve component is accordingly pressed into two knurlings.

According to an embodiment, the sleeve component and the outer ring are configured and adapted to each other in such a manner that a free space is produced between the sleeve component and the outer ring. In one embodiment, such a free space enables, for example, the introduction of a seal for sealing the constant velocity joint.

According to an embodiment, the sleeve component is configured as a sheet metal housing. A sheet metal housing has, for example, the advantage that it has a relatively low weight and that small forces are sufficient to produce the connection to the other components involved.

Depending on the embodiment, the end face of the shaft connection component has a surface which is closed or which is provided with at least one recess which faces the outer hub.

An embodiment makes provision for an end face of the shaft connection component facing the outer hub to be used as a stop face of the outer hub. In this embodiment, the end face of the shaft connection component has at least the size and geometry to use the outer hub in the installed state as a stop face. This is preferably carried out in such a manner that no significant spacings are produced between the mutually touching faces. In an embodiment, the faces of the outer hub and the shaft connection component are in each case configured in a planar manner or generally have mutually corresponding paths.

An embodiment involves the shaft connection component and the outer hub being configured and adapted to each other in such a manner that the shaft connection component and the outer hub together form a cup-like delimitation of the constant velocity joint. In this embodiment, the shaft connection component forms the base and the outer hub forms the side edge of a cup-like shape which delimits the associated side of the constant velocity joint. This embodiment enables, for example, an encapsulated joint which during use is, for example, filled with an appropriate lubricant.

An embodiment makes provision for the outer hub and the shaft connection component to be contacted by each other by means of an interference fit. The interference fit enables a secure connection so that, for example, changing the rotation direction does not lead to losses or noises.

The constant velocity joint according to the invention enables a large number of different shaft connection components to be connected to one type of outer hub. The embodiment of the shaft connection components is based in this instance on the type of components to which the joint is intended to be connected, and the manner in which the contacting is intended to be carried out. It is necessary in each case for the different shaft connection components to all have the raised portions which are used for connection to the outer hub.

An embodiment involves the shaft connection component having a pin which extends axially away from the outer hub.

An alternative embodiment makes provision for the shaft connection component to have a flange structure having at least one securing recess.

In detail, there are a large number of ways of configuring and developing the constant velocity joint according to the invention. In this regard, reference may be made, on the one hand, to the patent claims which are dependent on the independent patent claim, on the other hand, to the following description of an embodiment in connection with the drawings.

DETAILED DESCRIPTION

Figure 1:
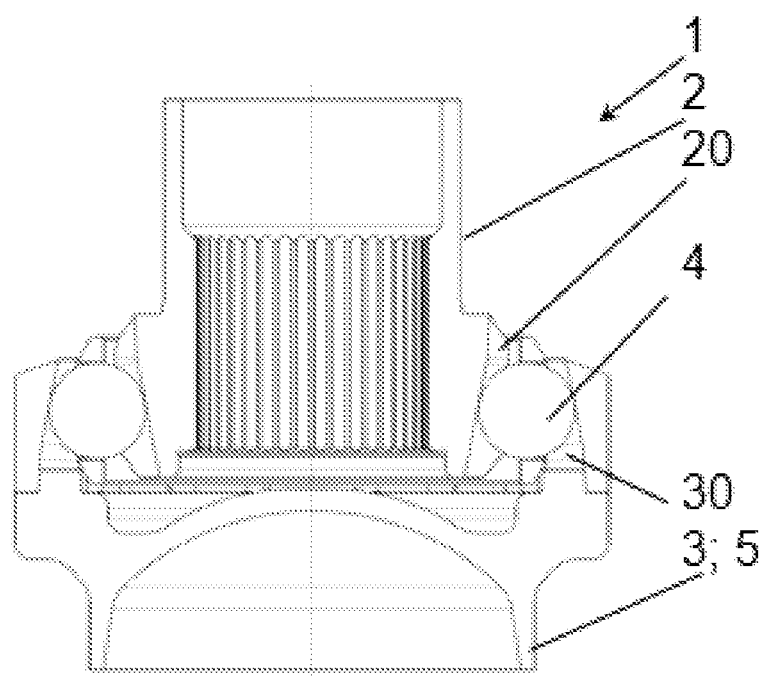
FIG. 1: is a section through a constant velocity joint.

FIG. 1 shows a constant velocity joint 1 according to the prior art having an inner hub 2 and outer hub 3. Both hubs 2, 3 each have tracks 20, 30 in which the balls 4 are located for the actual transmission of forces and torques. The balls 4 are in this instance, in order to prevent jamming, retained in the apertures of a cage. In this instance, it can be seen that the outer hub 3 merges in one piece into a shaft connection component 5.

Figure 2:
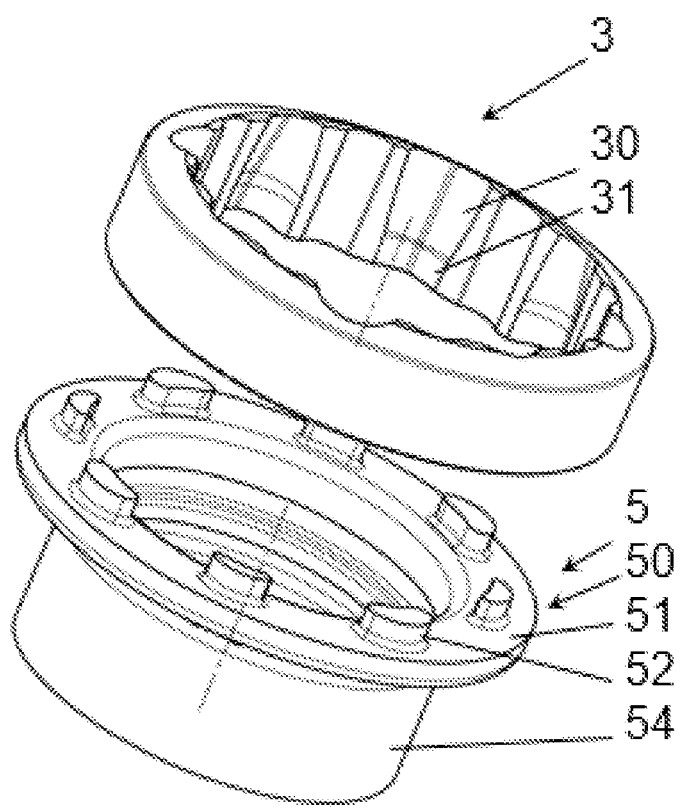
FIG. 2: is a spatial illustration of a first embodiment of a shaft connection component and an outer hub as components of a constant velocity joint.

FIG. 2 shows an exploded illustration of an embodiment of shaft connection component 5 and outer hub 3 of a constant velocity joint. The outer hub 3 has the tracks 30 for the balls and the axially adjacent recesses 31 which are open in the direction of the shaft connection component 5. The recesses 31 acting as a contacting structure have in this instance the same center axis, but a substantially different shape from the tracks 30. The recesses 31 and the tracks 30 are thus arranged axially in alignment one behind the other.

The shaft connection component 5 has, at the end facing away from the outer hub 3, a pin 54 which in the installed state enables the corresponding connection to a shaft. The end region 50 facing the outer hub 3 opens at an end face 51 with a central, continuous recess. At the edge of the recess, the end-face and consequently axially outwardly extending raised portions 52 are provided.

The geometries of the raised portions 52 and recesses 31 are in this instance adapted to each other in such a manner that a positive-locking connection is produced.

Figure 3:
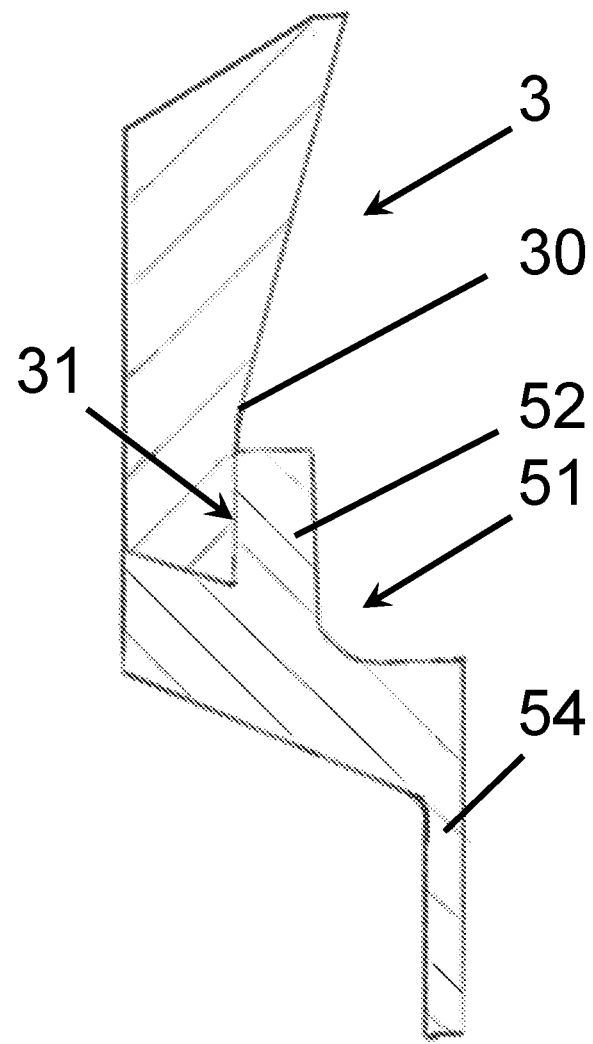
FIG. 3: is a section through a portion of the components of FIG. 2, FIG. 4: is a spatial illustration of a second embodiment of a shaft connection component and an outer hub as components of a constant velocity joint.

FIG. 3 is a section through the arrangement of FIG. 2. It can be seen that the raised portion 52 is located at the end face radially inside the outer hub 3 and protrudes into the recess 31. The contacting structure 31 acting as a region having a larger inner diameter and therefore protruding radially further outward is again an extension of the track 30. Furthermore, it can be seen that the pin 54 is hollow.

In the following Figures, substantially only the differences are described for the sake of clarity.

Figure 4:
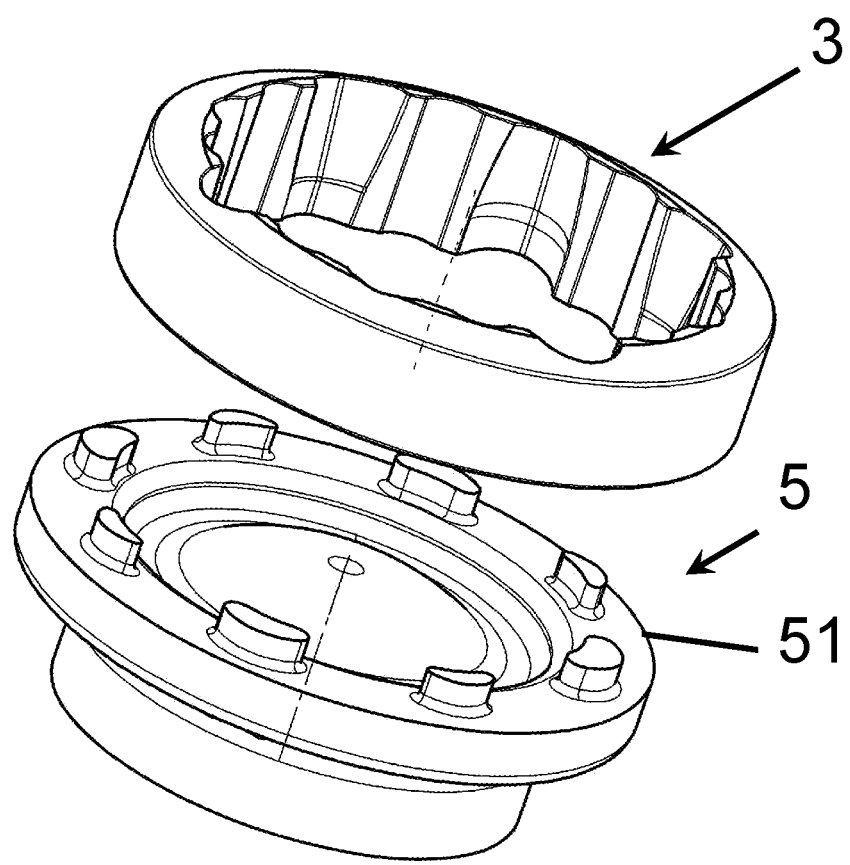

The embodiment of FIG. 4 differs from the embodiment of FIG. 2 in that the end face 51 of the shaft connection component 5 has a closed face. This leads to the shaft connection component 5 and the end face 51 forming a type of cup for the joint so that, for example, a lubricant can be introduced.

Figure 5:
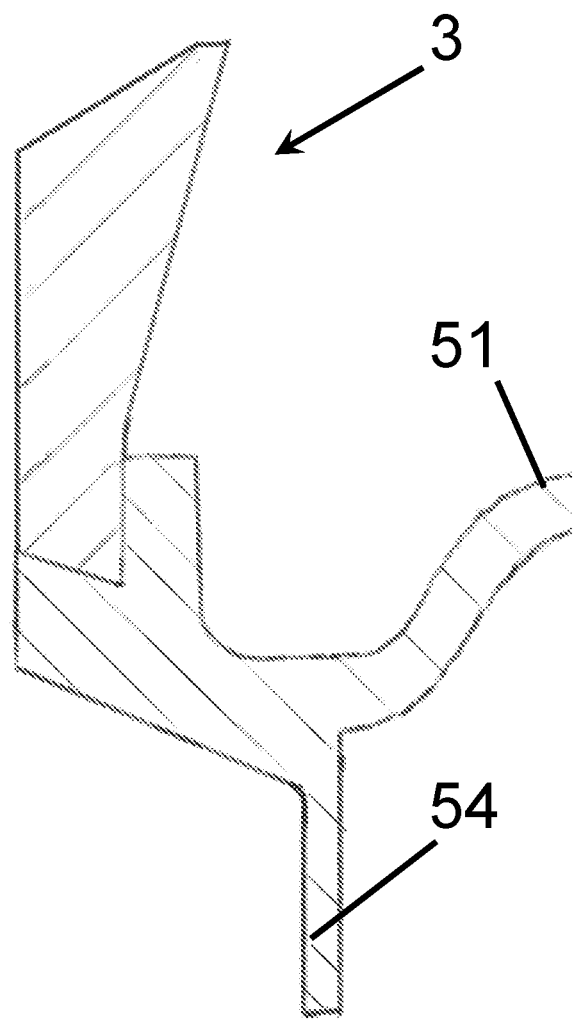
FIG. 5: is a section through a portion of the components of FIG. 4, FIG. 6: is a spatial illustration of a third embodiment of a shaft connection component and an outer hub as components of a constant velocity joint.

In the section of FIG. 5, it can be seen that the closed face of the end face 51 is curved in the direction of the joint or the outer hub 3. The adjacent pin 54 is in this instance also configured in a hollow manner.

Figure 6:
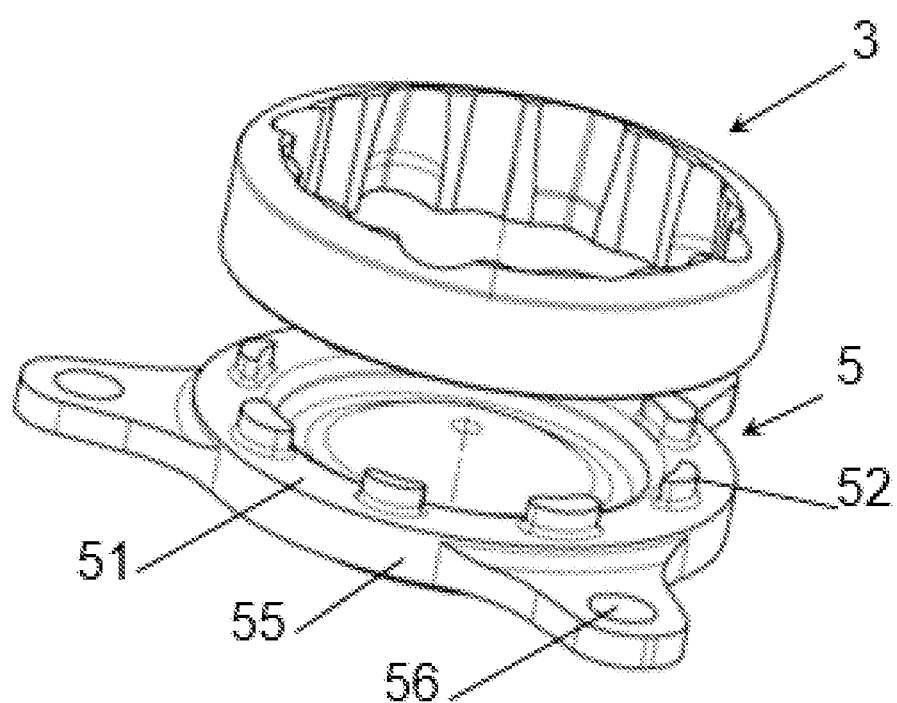

The embodiment of FIG. 6 differs from the previous embodiments with regard to the shape of the shaft connection component 5. The end face 51 with the raised portions 52 is adjoined by a flange structure 55 with three securing recesses 56 in this case. The end face 51 itself is provided with a closed face again.

In this instance, the invention enables extremely different variants of shaft connection components 5 to be connected to the same type of outer hub 3.

Figure 7:
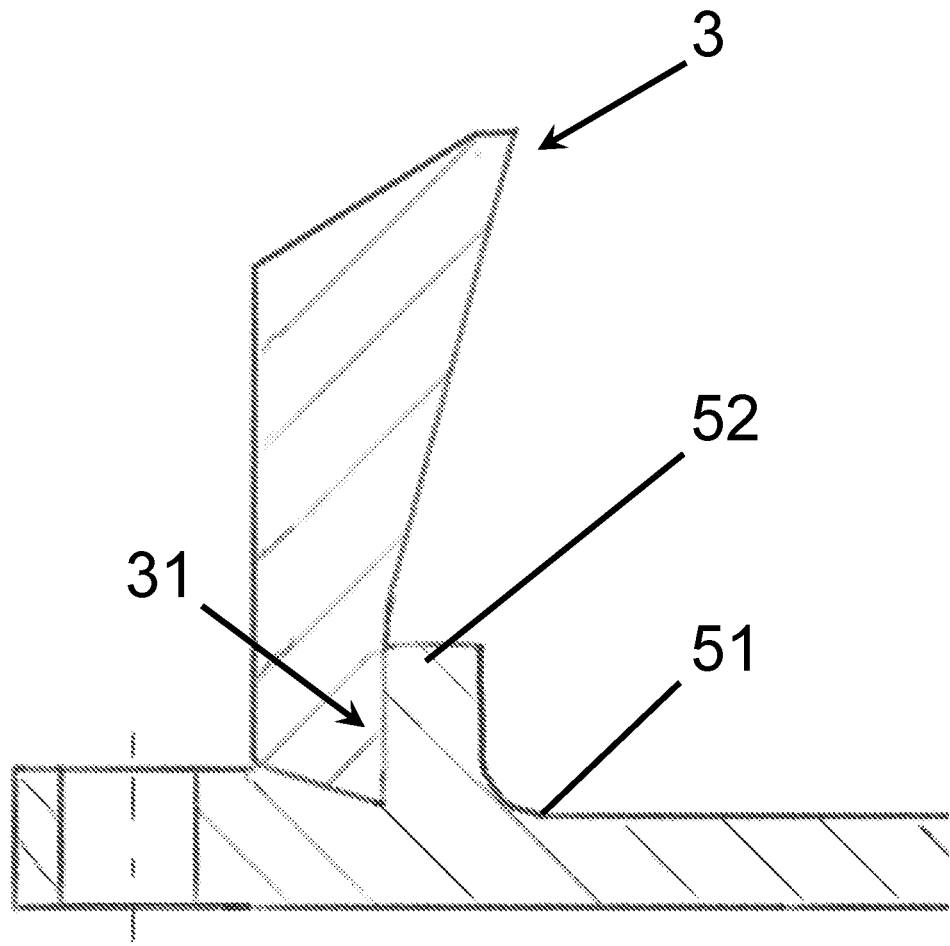
FIG. 7: is a section through a portion of the components of FIG. 6, FIG. 8: is a spatial illustration of an embodiment of a shaft connection component.

As shown in the section of FIG. 7, it is necessary for the geometries always to be fitting with regard to the connection. The raised portion 52 is thus also located in this instance at the end face 51 radially inside the recess 31 of the contacting structure of the outer hub 3.

Figure 8:
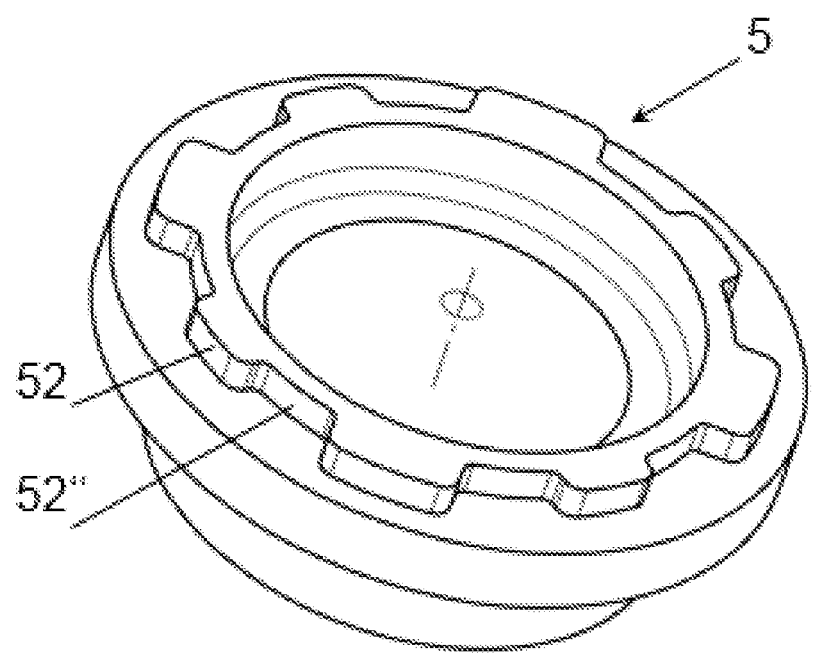

The shaft connection component 5 of FIG. 8 differs from the previous variants in that the raised portions 52 obtain at the radial inner side thereof a reinforcement or stabilization as a result of a radially peripheral collar 52". The collar 52" is in this instance also a closed structure. The raised portions 52 and the collar 52" are in this instance configured to be coherent. In an alternative embodiment which is not shown, there is a spacing between the raised portions 52 and the collar 52".

Figure 9:
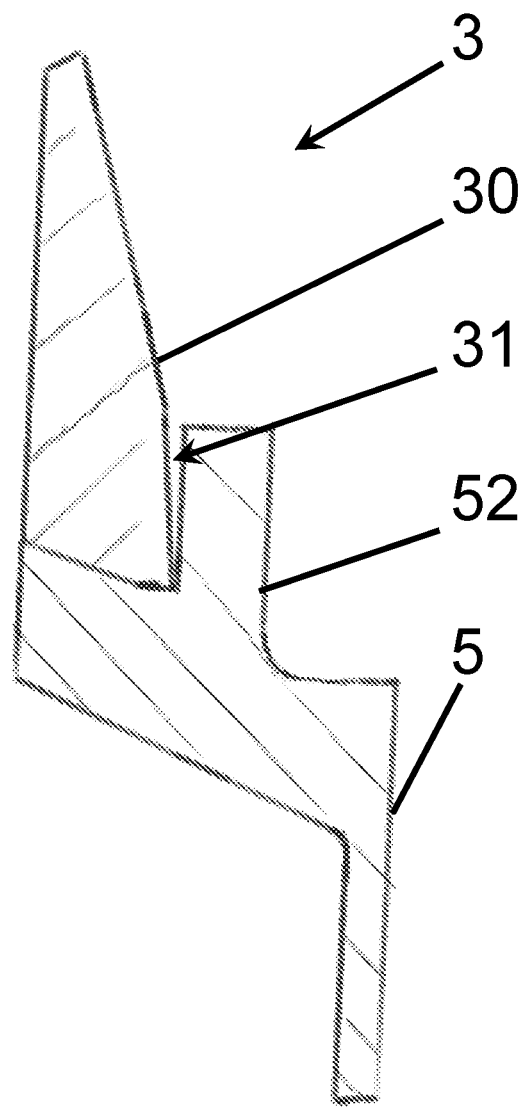
FIG. 9: is a section through a fourth embodiment of a shaft connection component and an outer hub.

The section of FIG. 9 shows an embodiment in which the outer hub 3 in extension of the track 30 has a recess or a return 31 as a contacting structure. In this instance, the track 30 or the contacting structure 31 adjoins in the direction of the shaft connection component 5, that is to say, there is a reduction of the inner diameter in an axial direction. Radially inside the outer hub 3 there is the raised portion 52 of the shaft connection component 5. After the two components have been combined, a—preferably axially effective—force is applied to the raised portion 52 so that this moves into the contacting structure 31. The connection between the shaft connection component 5 and outer hub 3 is thus produced using forming technology.

Figure 10:
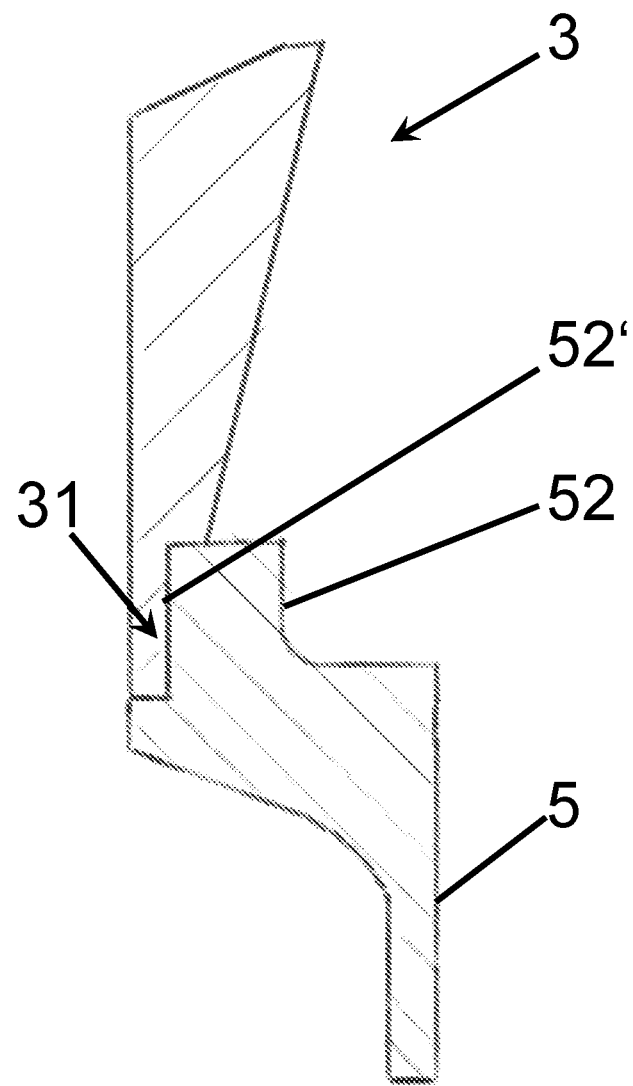
FIG. 10: is a section through a fifth embodiment of a shaft connection component and an outer hub.

A similar directly and partially materially engaging connection is produced in the embodiment of FIG. 10. In this instance, the shaft connection component 5 has at the radial outer side of the raised portions 52 a knurling 52'. During assembly, the material of the contacting structure 31 of the outer hub 3 is introduced therein. A knurling interference fit is thus produced and brings about a torque transmission. In an alternative embodiment—not illustrated in this instance—the outer hub 3 carries a knurling into which the material of the shaft connection component is introduced.

In the following three embodiments, only two components are no longer connected to each other, but instead a third component produces an indirect contacting between the other two components.

Figure 11:
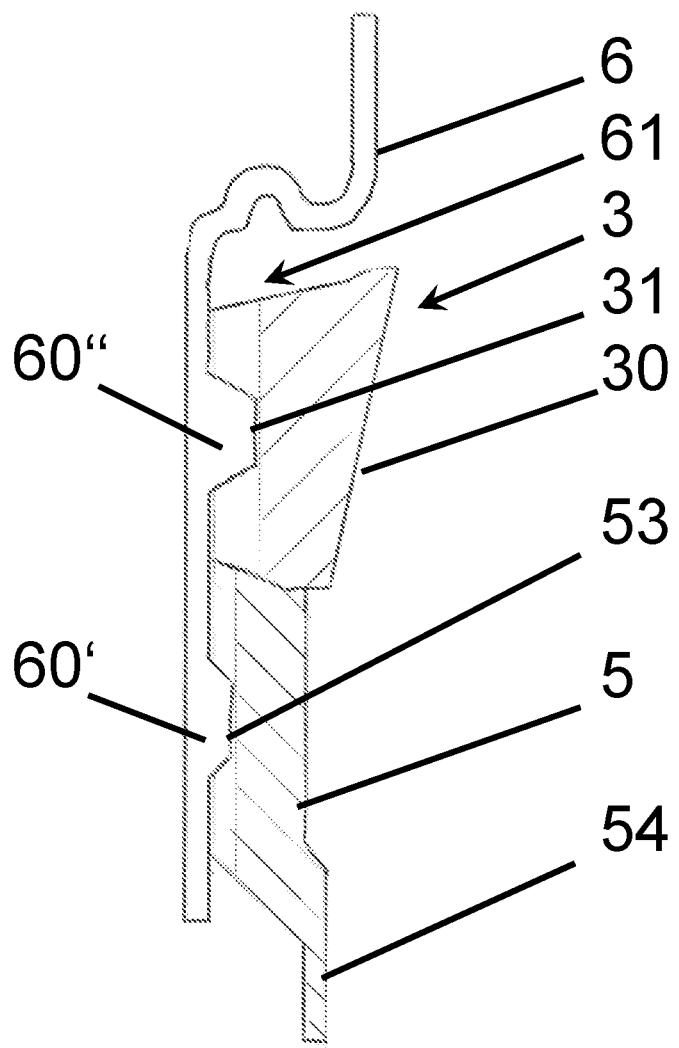
FIG. 11: is a section through a sixth embodiment of a shaft connection component and an outer hub.

FIG. 11 shows an outer hub 3 with the tracks 30 at the radial inner side and recesses 31 as a contacting structure at the outer side. The shaft connection component 5 also has in this instance a pin 54 and a securing structure which is configured in this instance as a securing recess 53. Consequently, both the outer hub 3 and the shaft connection component 5 have recesses 31, 53 at the outer side. The sleeve component 6 which is configured in this instance as a sheet metal component is located there. The sleeve component 6 has at the inner side thereof radially inwardly protruding carrier components 60', 60" which engage in the recesses 31, 53 and which consequently bring about the positive-locking connection for torque transmission between the outer hub 3 and shaft connection component 5. Between the upper end of the sleeve component 6 and the end region of the outer hub 3, a free space 61 which in the assembled state forms, for example, a seal, is formed.

It can also be seen that the carrier component 60' which engages in the securing recess 53 has a substantially smaller radial extent than the carrier component 60" which engages in the recess 31 of the outer hub 3. The last carrier component 60" mentioned thus protrudes radially further inward than the other carrier component 60'. This results in the component not coming into contact with the carrier components in front of it during the joining operation.

Figure 12:
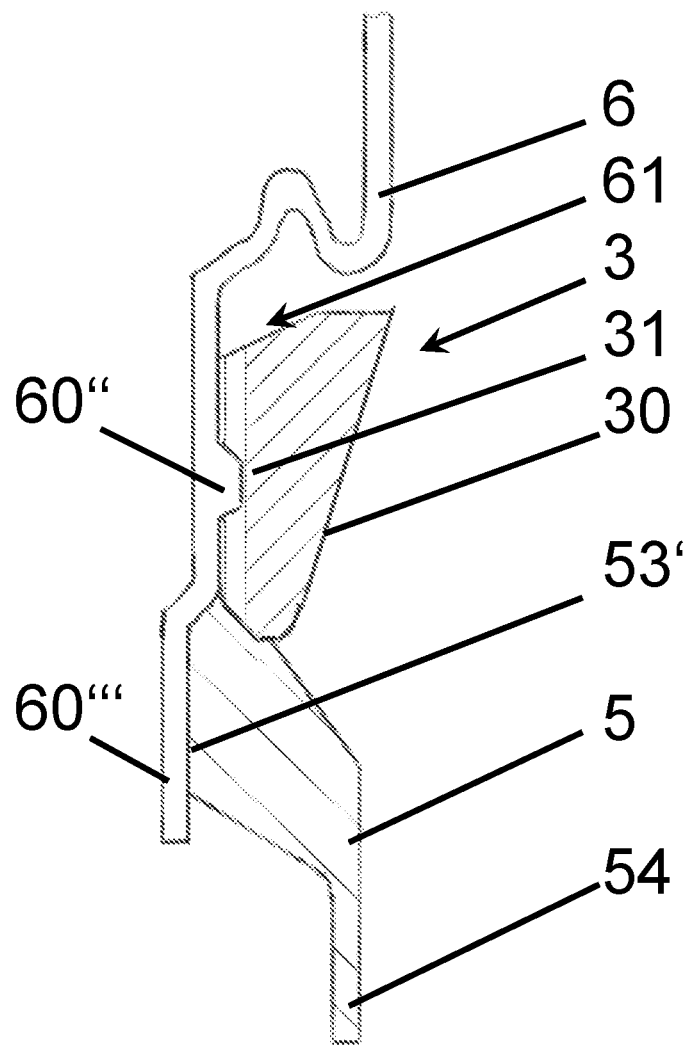
FIG. 12: is a section through a seventh embodiment of a shaft connection component and an outer hub.

The difference between the variants of FIG. 11 and that of FIG. 2 is that in the embodiment of FIG. 12 the shaft connection component 5 has at the outer side thereof a knurling 53'. During assembly, a portion of the sleeve component 6 is pressed as a carrier component 60" into this knurling 53'. In an alternative variant—not illustrated in this instance—the outer hub 3 has a knurling in which the material of the shaft connection component 5 is pressed.

Figure 13:
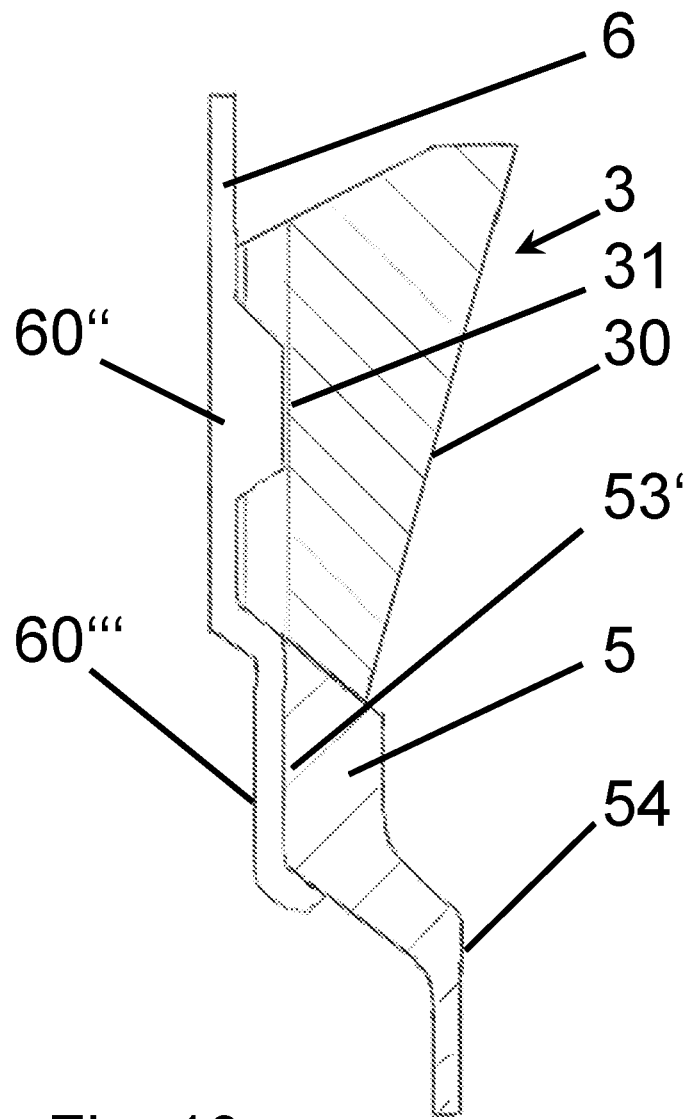
FIG. 13: is a section though an eight embodiment of a shaft connection component and an outer hub.

The variant of FIG. 13 is similar to the embodiment of FIG. 12 in that the connection between the shaft connection component 5 and sleeve component 6 and between the outer hub 3 and sleeve component 6 is configured to be identical. A carrier component 60" is thus introduced into the recess 31 of the contacting structure of the outer hub 3 and another carrier component 60''' is pressed into the knurling 53' of the shaft connection component 5. A knurling interference fit consequently serves to transmit torque.

The difference is that there is no free space above the outer hub 3. In addition, the sleeve component 6 surrounds with the end thereof an edge of the shaft connection component 5. This is carried out, for example, by means of a beading.

Figure 14:
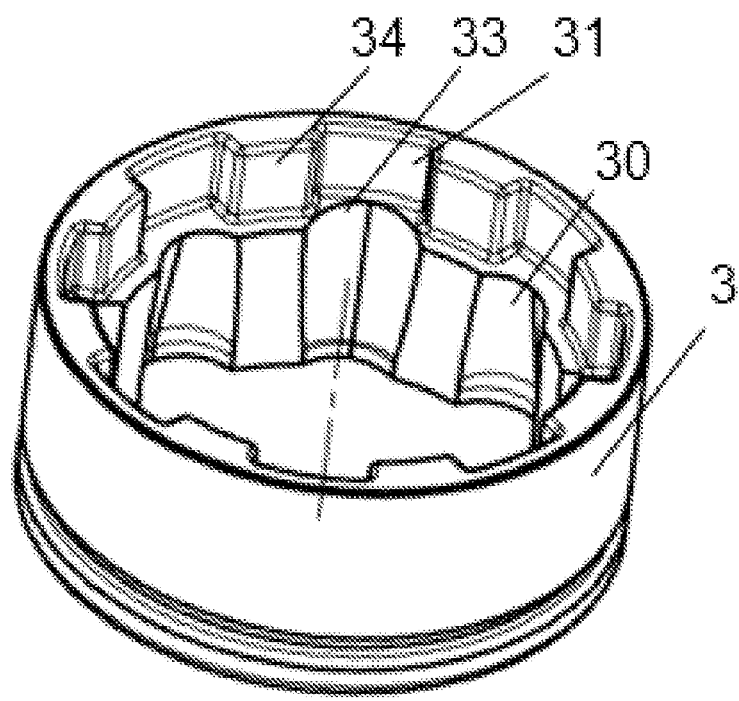
FIG. 14: is a spatial illustration of a ninth embodiment of the outer hub.

In the outer hub 3 of FIG. 14, the tracks 30 and the recesses 31 are configured to be axially in alignment with each other. The recesses 31 are consequently located on an axial extension of the tracks 30. It can be seen that a peripheral shoulder 33 is located between the tracks 30 and the recesses 31. This is the region in which the tracks 30 open with their rather rounded shape and from which the recesses 31 and the radially inwardly protruding teeth 34 begin with their rather planar shapes. The teeth 34 and the recesses 31 alternate with each other in a radially peripheral direction. This end face of the outer hub 3 is surrounded for the connection to the shaft connection component by a closed edge which is located radially at the outer side. If raised portions of the shaft connection component—not illustrated in this instance—engage in the recesses 31, therefore, they are surrounded in an outward direction by the closed edge.

Figure 15:
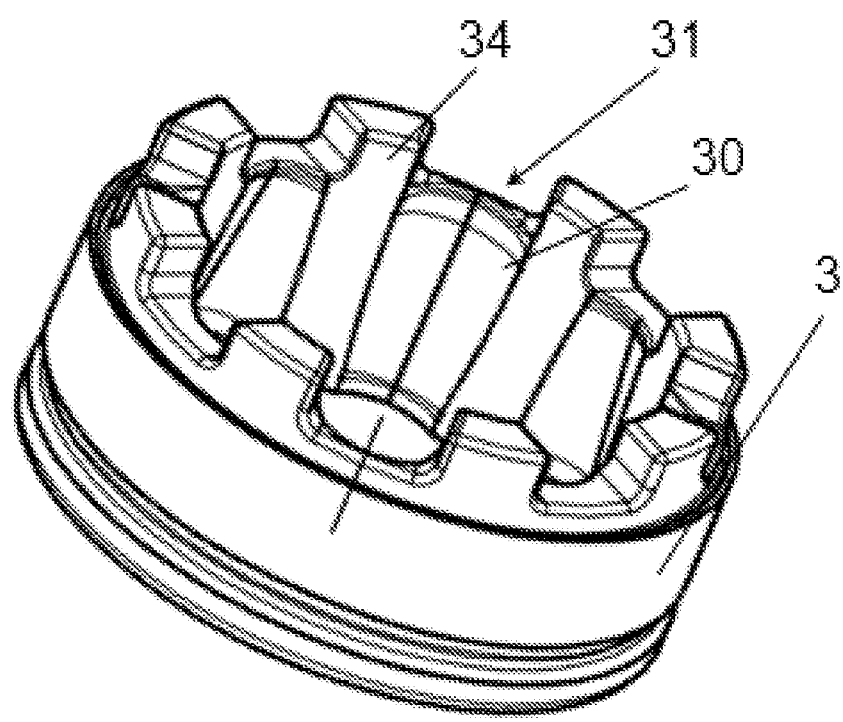
FIG. 15: is a spatial illustration of a tenth embodiment of the outer hub.

In the embodiment of the outer hub 3 of FIG. 15, in comparison with the embodiment of FIG. 14, the edge of the outer hub 3 is not present so that the recesses 31 are produced as open cavities between the teeth 34. The recesses 31 nonetheless axially follow the tracks 30. There is also no shoulder present in this instance, as in FIG. 14. The teeth 34 continuously follow the portions between the tracks 30. It can also be seen that the teeth 34, in contrast to the variant of FIG. 14, begin radially further inward so that a radially outer edge is produced.

Figure 16:
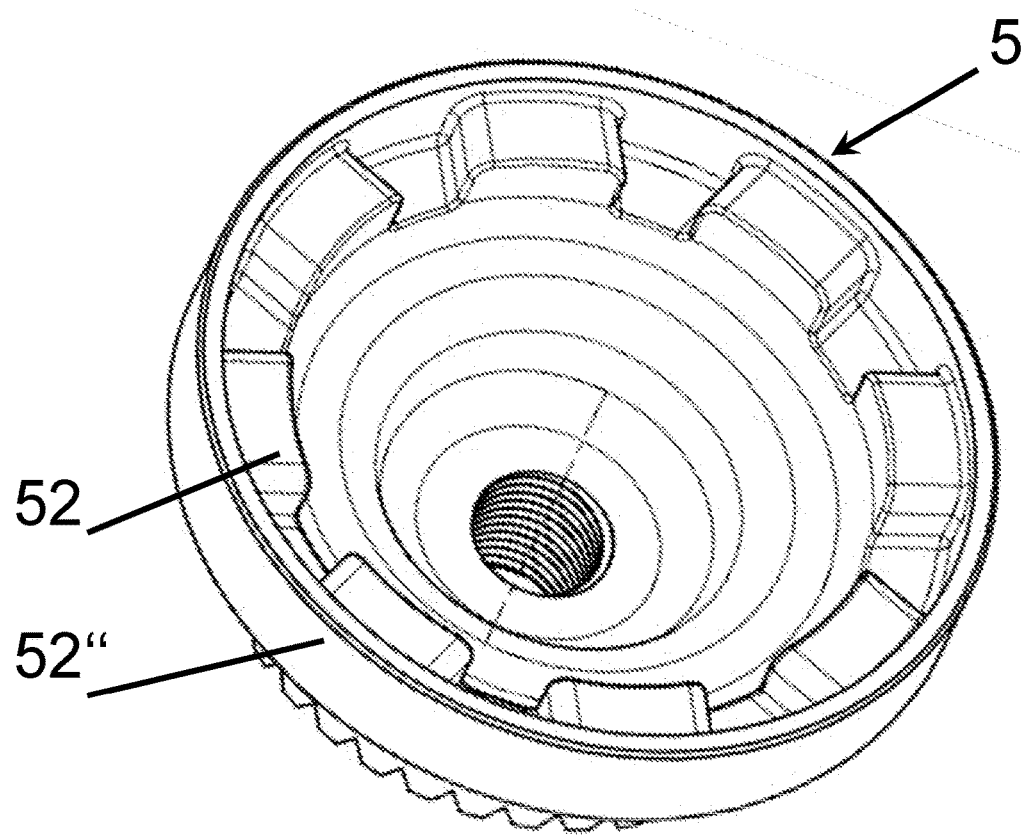
FIG. 16: is a spatial illustration of a shaft connection component fitting the outer hub of FIG. 15.

A shaft connection component 5 which in principle fits the outer hub 3 is shown in FIG. 16. There are provided therein the end-face raised portions 52 which are surrounded at the radial outer side thereof by a peripheral collar 52". This collar 52" surrounds in the assembled state the teeth 34 of the outer hub 3. The arrangement of the collar 52" of the embodiment of FIG. 16 is consequently an alternative to the variant of FIG. 8.

The invention claimed is:

1. A constant velocity joint, comprising:
   an inner hub having tracks;
   an annular outer hub having tracks corresponding to the inner hub tracks, the tracks of the outer hub defining at least a first inner diameter;
   a plurality of balls; and
   a shaft connection component,
   wherein
      the inner hub and the outer hub are arranged such that respective tracks form axially-aligned pairs,
      each of the pairs of tracks receive one of the plurality of balls,
      the outer hub has a contacting structure in the form of recesses,
      at least one recess of the recesses defines at least a second inner diameter less than the first inner diameter,
      the shaft connection component has a securing structure in the form of raised portions at an end region facing the outer hub,
      the outer hub is in contact with the shaft connection component such that the securing structure and the contacting structure are indirectly or directly connected to each other in one or both of a non-positive-locking and a torque-transmitting manner, and
      the tracks of the outer hub and the recesses of the outer hub are axially aligned with each other.

2. The constant velocity joint according to claim 1, wherein
   the recesses of the outer hub are arranged at an end face of the outer hub.

3. The constant velocity joint according to claim 2, wherein
   the recesses of the outer hub are semi-annular.

4. The constant velocity joint according to claim 1, wherein
   the raised portions of the shaft connection component are configured to deform during engagement in the recesses of the outer hub to axially secure the shaft connection component and the outer hub.

5. The constant velocity joint according to claim 4, wherein
   the recesses are located as returns at an outer side of the outer hub.

6. The constant velocity joint according to claim 1, wherein
   the raised portions are at an end face of the shaft connection component, and
   the raised portions are connected to each other by a radially peripheral collar.

7. The constant velocity joint according to claim 6, wherein
   the radially peripheral collar is arranged at a radial inner side of the raised portions.

8. The constant velocity joint according to claim 6, wherein
   the radially peripheral collar is arranged at a radial outer side of the raised portions.

9. The constant velocity joint according to claim 1, wherein
   the shaft connection component and the outer hub together form a cup-shaped delimitation of the constant velocity joint.

10. The constant velocity joint according to claim 9, wherein
    an end face of the shaft connection component has a closed face.

11. The constant velocity joint according to claim 1, further comprising:
    a sleeve configured to concentrically surround the shaft connection component,
    wherein the shaft connection component has a flange structure having at least one securing recess configured to receive the sleeve on an outer radial surface of the shaft connection component.

12. A constant velocity joint, comprising:
    an inner hub;
    an outer hub including recesses;
    a plurality of balls; and
    a shaft connection component including:
       raised portions; and
       a flange structure including at least one securing recess,
    wherein
       the plurality of balls are received radially between the inner hub and the outer hub, and
       the outer hub is in contact with the shaft connection component such that the raised portions and the recesses are indirectly or directly connected to each other in one or both of a non-positive-locking and a torque-transmitting manner.

13. The constant velocity joint of claim 12, wherein the raised portions extend from an end face of the shaft connection component.

14. The constant velocity joint of claim 13, wherein the shaft connection component defines a longitudinal axis, and wherein the raised portions extend from the end face of the shaft connection component along the longitudinal axis.

15. The constant velocity joint of claim 12, wherein the flange structure extends from an outer radial surface of the shaft connection component.

16. The constant velocity joint of claim 15, further comprising:
- a sleeve configured to concentrically surround the shaft connection component,
- wherein the at least one securing recess is configured to receive the sleeve on the outer radial surface of the shaft connection component.

17. The constant velocity joint of claim 12, wherein the raised portions are axially received within the recesses to couple the outer hub with the shaft connection component.

18. The constant velocity joint of claim 12, wherein:
- the inner hub has tracks,
- the outer hub has tracks corresponding to the tracks of the inner hub,
- the inner hub and the outer hub are arranged such that respective tracks form axially-aligned pairs, and
- each of the pairs of tracks receive one of the plurality of balls.

19. The constant velocity joint of claim 18, wherein an inner diameter of the outer hub at the recesses is less than the inner diameter of the outer hub at the tracks.

20. A constant velocity joint, comprising:
- an inner hub including tracks;
- an outer hub including recesses and tracks, the tracks of the outer hub defining at least a first inner diameter;
- a plurality of balls; and
- a shaft connection component including raised portions, wherein
  - the plurality of balls are received radially between the inner hub and the outer hub,
  - at least one recess of the recesses defines at least a second inner diameter less than the first inner diameter, and
  - the outer hub is in contact with the shaft connection component such that the raised portions and the recesses are indirectly or directly connected to each other in one or both of a non-positive-locking and a torque-transmitting manner.

* * * * *